(12) United States Patent
Ehrhart et al.

(10) Patent No.: US 7,832,189 B1
(45) Date of Patent: Nov. 16, 2010

(54) APPARATUS TO IMPROVE MODULAR CUTTERBAR CONNECTING SHAFT SPLINE DURABILITY

(75) Inventors: Philip J. Ehrhart, Narvon, PA (US); Donald L. Osborne, Quarryville, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/616,731

(22) Filed: Nov. 11, 2009

(51) Int. Cl.
*A01D 34/00* (2006.01)

(52) U.S. Cl. .......................... 56/13.6; 464/16; 464/162

(58) Field of Classification Search ............... 464/16, 464/162; 56/13.6, 10.4, 6, 7, 12.3, 255, 295, 56/16.4 R, DIG. 6, DIG. 10; 74/606 R
See application file for complete search history.

(56) References Cited

U.S. PATENT DOCUMENTS

| 2,090,066 | A |   | 8/1937  | Peterson |
|---|---|---|---|---|
| 3,507,102 | A |   | 4/1970  | Kline et al. |
| 3,543,489 | A |   | 12/1970 | Maier et al. |
| 4,197,692 | A |   | 4/1980  | Weber |
| 4,693,062 | A |   | 9/1987  | Van Der Lely et al. |
| 4,840,019 | A |   | 6/1989  | Pingry |
| 5,715,663 | A | * | 2/1998  | Getz ................................. 56/6 |
| 5,784,866 | A | * | 7/1998  | Campbell et al. ................. 56/6 |
| 5,809,757 | A | * | 9/1998  | McLean et al. ................ 56/13.6 |
| 5,875,619 | A | * | 3/1999  | McLean et al. ................... 56/6 |
| 5,907,948 | A | * | 6/1999  | Ellis ........................... 56/13.6 |
| 5,996,323 | A |   | 12/1999 | Campbell et al. |
| 7,730,703 | B1 * | 6/2010 | Ehrhart et al. ............... 56/13.6 |
| 2002/0157366 | A1 * | 10/2002 | Preipke et al. .................... 56/6 |

FOREIGN PATENT DOCUMENTS

FR 2778215 A1 11/1999

* cited by examiner

*Primary Examiner*—Árpád Fábián-Kovács
(74) *Attorney, Agent, or Firm*—Patrick M. Sheldrake; Michael G. Harms

(57) ABSTRACT

An improved modular disc cutterhead connecting drive shaft configuration having a means for laterally centering the shaft between adjacent cutterhead modules thereby equalizing engagement on each end of the shaft with the module connectors. Further durability improvement is realized by a structure to radially center the shaft in the shaft receptacles of each module to maintain uniform loading on the shaft/receptacle interface which improves the durability of the connecting drive shaft end connections. Additional connecting shaft durability is provided by a means to lubricate the drive shaft connector connecting interfaces using lubricant reservoirs disposed within the modules.

11 Claims, 3 Drawing Sheets

APPARATUS TO IMPROVE MODULAR CUTTERBAR CONNECTING SHAFT SPLINE DURABILITY

BACKGROUND OF THE INVENTION

This invention relates generally to a machine for severing standing crops from the ground to initiate a harvesting process and, more particularly, to a rotary disc cutterbar having a preselected number of transversely oriented, rotatable discs interconnected by shafts and a method to improve the durability of splines on the interconnecting shafts.

One type of disc cutterbar used in agriculture includes a plurality of elongated modular housings each containing a bevel gear set for delivering power to respective modular cutterheads spaced along the length of the cutterbar. Power is transferred from the vehicle power take-off to adjacent modules by a plurality of connecting shafts. The cutterheads each comprise a cutting disc including diametrically opposed cutting blades (though configurations with three or more blades are known) and having a hub coupled to an upper end of a drive shaft, the lower end of the drive shaft carrying a bevel gear. The connecting shafts utilize splined shaft connections to pinon gears which in turn engage the bevel gears and allow power to be transferred along the width of the cutterbar. For background information on the structure and operation of some typical disc cutterbars, reference is made to U.S. Pat. No. 5,996,323, issued to Campbell, the descriptive portions thereof being incorporated herein in full by reference.

Current cutterbar production and assembly methods allow the connecting shafts to freely float between adjacent modules which have led to durability concerns. Absent a biasing element to center the shaft laterally between adjacent modules, the connecting shafts may laterally shift to one end or oscillate in a position. The spline connection is currently lubricated with grease during assembly which over time may lead to operational conditions in which inadequate lubrication is present in the connection. Oscillating movement can lead to fretting of the splines. Left unchecked, the tolerances in the splined connection may degrade to a point at which the connecting shaft may no longer rotate about its axial centerline. Shaft rotation about a slightly eccentric rotational path results in increased vibration which speed degradation of other components within the driveline. Further, a connecting shaft that has shifted laterally toward one module results in differing engagement areas between the two splined end connections which results in uneven wear between the connecting shaft splined ends.

It would be advantageous to have an improved modular cutterhead connecting shaft configuration which would improve the durability of the connecting shaft splined end connections with adjacent cutter modules. Further advantages would be realized by an connecting shaft splined end connection that utilized lubricant retained in the module gearbox housing to provide periodic lubrication of the splines. Still further advantages would be realized through the inclusion of apparatus to maintain the connecting shaft ideally positioned between adjacent cutterhead modules.

SUMMARY OF THE INVENTION

Accordingly, the present invention, in any of the embodiments described herein, may provide one or more of the following advantages:

It is an object of the present invention to provide an improved connecting shaft for a modular cutterbar featuring means to lubricate shaft splines using lubricant from a gearbox reservoir within the module.

It is another object of the present invention to provide an improved connecting shaft for a modular cutterbar assembly in which the connecting shaft incorporates positioning means to provide symmetric engagement of drive splines at each end of the connecting shaft.

It is a further object of the present invention to provide an improved connecting shaft for a modular cutterbar assembly in which the connecting shaft splined connections with the module hub incorporate radial centering means to maintain uniform spline tooth loading and improve spline durability.

It is a still further object of the present invention to provide an improved connecting shaft for a modular cutterbar assembly that is durable in construction, inexpensive of manufacture, carefree of maintenance, easily assembled, and simple and effective to use.

These and other objects are achieved in accordance with the instant invention by providing an improved connecting shaft for a modular cutterbar having a means for laterally centering the shaft between adjacent modules thereby equalizing spline engagement on each end of the shaft and radially centering the shaft in the mating hubs of each module to maintain uniform spline tooth loading. Additional connecting shaft durability is provided by a means to lubricate the connecting shaft splined interfaces with the adjacent module hubs using lubricant reservoirs disposed within the modules.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
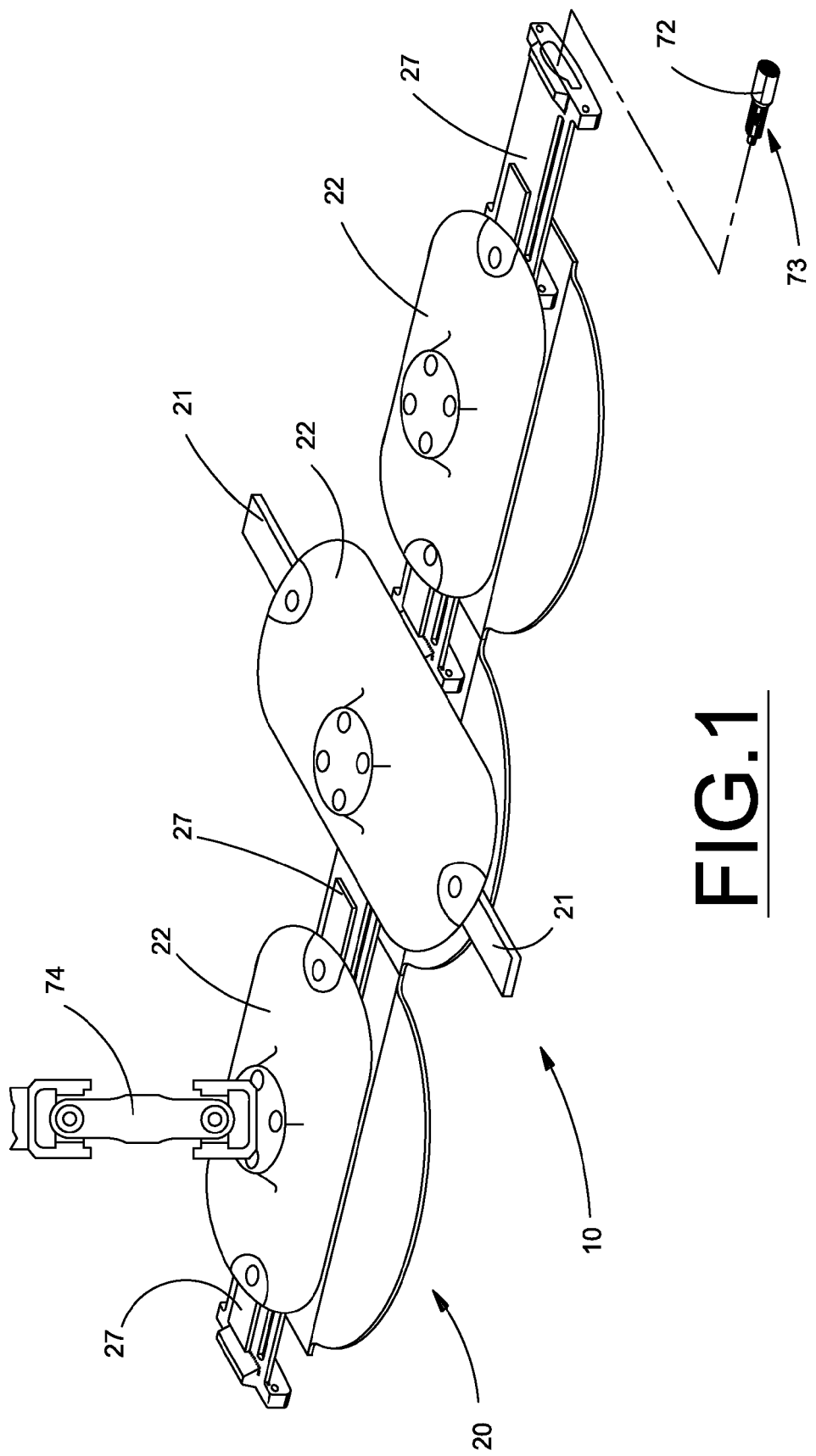
FIG. 1 is a partial perspective view of a modular disc cutterbar of the type commonly used on agricultural harvesters of the type on which the present invention is useful.

Referring now to the drawings and particularly to FIG. 1, a portion of a modular disc cutterbar 10 of the type on which the present invention finds utility is presented. Disc cutterbars have been utilized in agricultural harvesting implements for many years. Each disc cutterbar includes a plurality of transversely spaced disc cutter modules 20 driven for rotation about a generally vertical axis. Each disc cutter module 20 has two or more knives 21 pivotally mounted on the periphery of a rotating cutter head 22 to sever standing crop from the ground through an impact action. The disc cutter modules are spaced-apart by a plurality of hollow spacer modules 27 which maintain cutter module spacing and enclose a transversely arranged drive train which powers the cutter modules. For background information on the structure and operation of disc cutterbars, reference is made to U.S. Pat. No. 4,815,262, issued to Koch et al. and to U.S. Pat. No. 5,996,323, issued to Campbell et al., the descriptive portions thereof being incorporated herein in full by reference.

Figure 2:
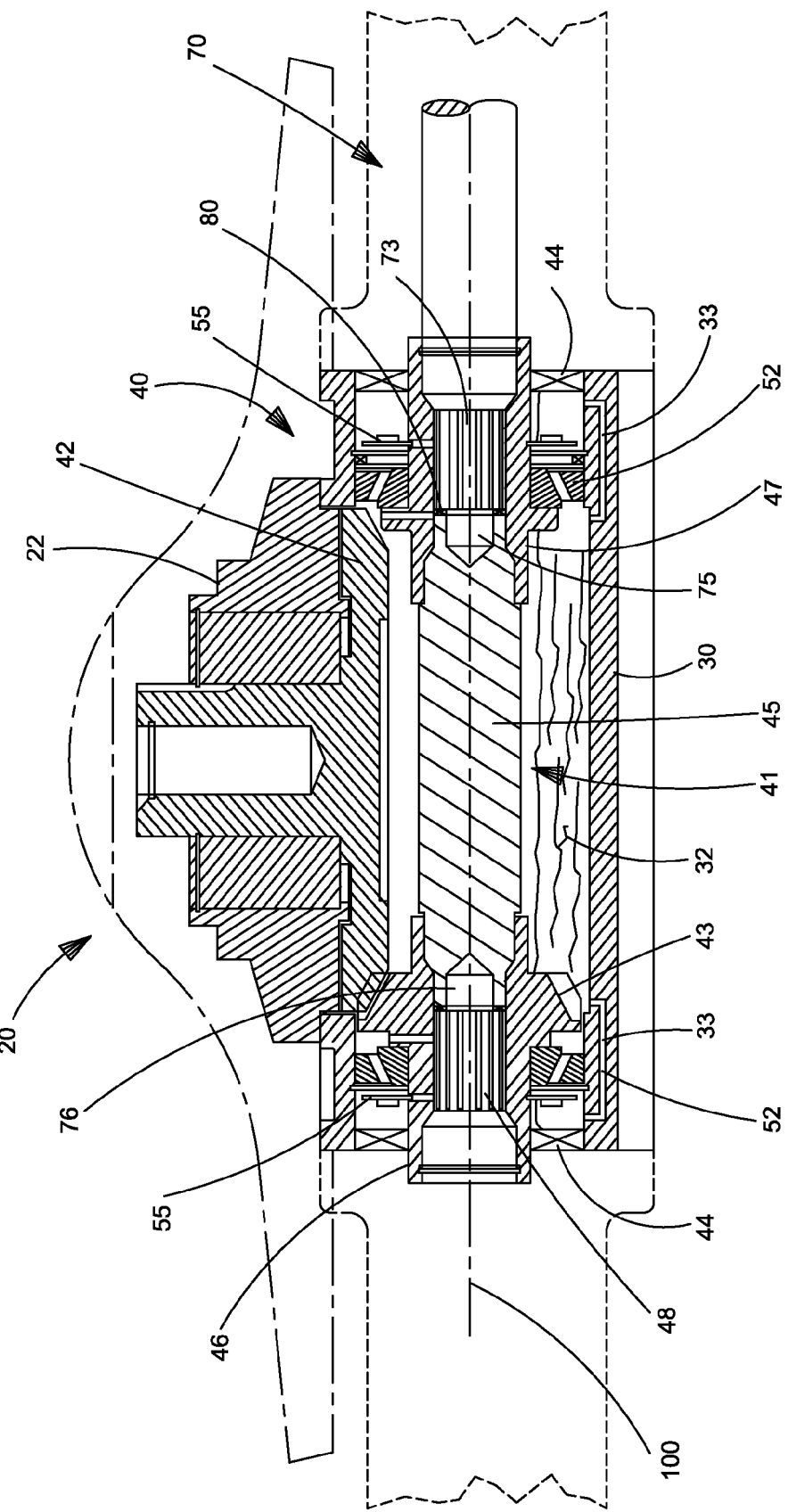
FIG. 2 is a cross-sectional view of one of the cutter modules used on the cutterbar shown in FIG. 1, incorporating the drive train improvements of the instant invention.

Now referring to FIG. 2 wherein one of the plurality of disc cutter modules 20 is shown having a generally hollow cast housing 30 having a specific shape to retain a low profile and to establish an oil reservoir 32 therewithin. The housing 30 supports a drive mechanism 40 to rotate a disc hub 22 positioned for rotational movement above the housing 30. In a typical modular cutterbar made up of several identically configured modules, a drive train 70 is provided to convey motive power to each module in the cutterbar from one or more modules (typically outboard modules on the cutterbar via a drop-down shaft 74, shown in FIG. 1) that receive input power from the tractor power take-off (PTO). Drive mechanisms 40 of adjacent disc cutter modules 20 are connected by drive transfer shafts 72 in a manner to rotationally couple all modules in the cutterbar. Drive transfer shafts 72 typically engage the drive mechanism 40 in each adjacent cutter module with a splined interface at each end of the drive transfer shaft 72, or similar shaft connection capable of enabling limited axial displacement while transferring torque.

The drive mechanism 40 comprises bevel gear 42 and a pinion gear 43. Drive train 70 comprises a plurality of elongate drive shafts 72 disposed between each adjacent pair of modules within spacer modules 27. Each end of drive shaft includes a spline portion 73 which is configured to be received by spline receptacles 48 in hubs at each end of a pinion assembly 41. The skilled artisan will recognize that alternatives to the spline interface may also benefit from the durability improvements of the present invention, specifically shaft connection configurations capable of enabling limited axial displacement of the shaft while transferring torque. Pinion assembly 41 comprises a pinion hub 46 and a connector hub 47 connected at opposite ends of an elongate pinion shaft 45 for rotation in unison. A pinion gear 43 is connected to pinion hub 46 for rotation therewith and arranged to mesh with bevel gear 42 to transfer rotational energy to the cutter head 22 which is connected to the ring gear. The pinion assembly 41 is positioned within the hollow interior of housing 30 and supported by bearings 52 at each end for rotation about axis 100. Motive power input at one end of the pinion assembly is transferred to the opposite side of the assembly for powering an adjacent module and also powers the cutter head 22 via the pinion and ring gear in the module.

A portion of each hub on the ends of pinion assembly 41 projects through the housing 30 to the exterior of the module for connection to drive shafts 72 extending from an adjacent cutter module. Oil seals 44 disposed at the opening through which the hubs project through the housing wall contain the lubricant within the module housing while allowing rotation of the pinion assembly 41. Oil slingers 55 connected to the hubs 46, 47 aid in lubricating the seals and bearings. Oil passages 33 are provided in the housing 30 to assure that oil from the reservoir 32 fills the space between the bearings 52 and the outer oil seals 44 so that the oil slingers 55 will come in contact with the oil as the pinion assembly rotates.

Figure 3:
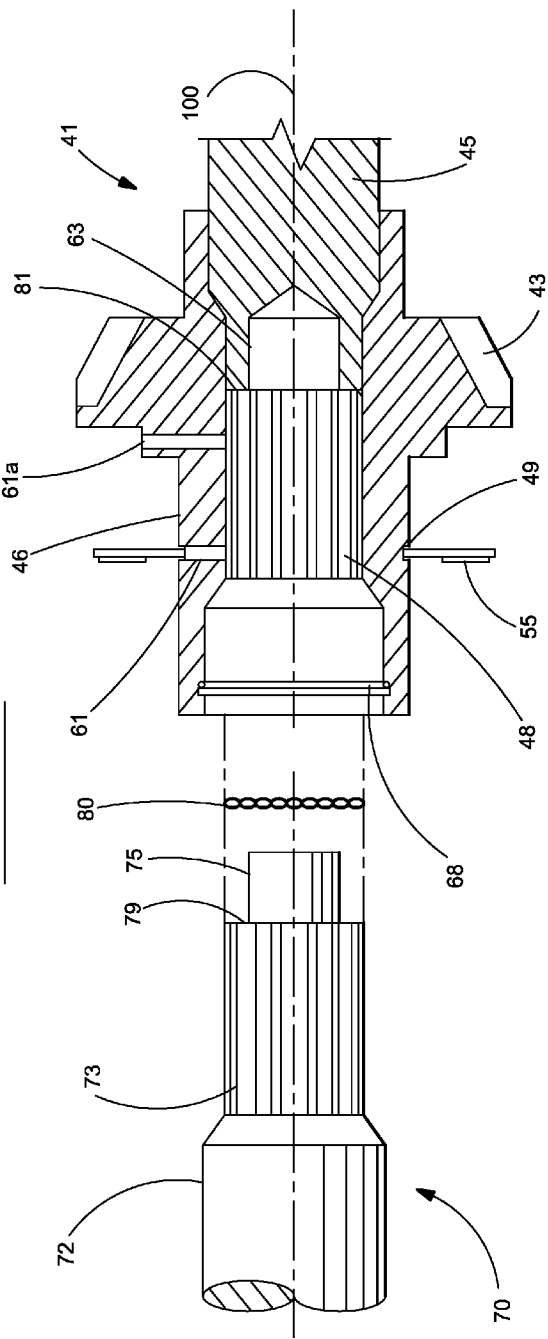
FIG. 3 is a cross-sectional view of a pinion hub showing one embodiment of the apertures used in the present invention to improve drive shaft spline lubrication.

Now referring to FIGS. 2 and 3, hubs 46, 47 further comprise a plurality of apertures 61 extending from the exterior portion of the hub inwardly toward the spline receptacles 48. In the embodiment shown, apertures 61 are aligned radially about axis 100 and positioned longitudinally proximate to the base of oil slingers 55 where they connect to the hub. At least three apertures 61 are preferred and spaced approximately 120 degrees apart so that one of the apertures will be oriented upwardly when the pinion assembly 41 is not rotating. The upwardly oriented aperture 61 will collect oil from a groove 49 on the exterior surface of the hub at the connection point for the oil slinger 55. Further, as the oil slingers are axially positioned in the groove 49, oil adhering to the surface of the upwardly oriented slingers 55 will tend to flow toward the groove 49 and aperture 61 as well. Once oil enters the aperture 61, it is channeled by gravity inwardly toward the spline interface to lubricate the splines. A seal 68, preferably an O-ring, disposed circumferentially in the receptacle 48 prevents excessive oil directed toward the splines from flowing out of the module housing, or alternatively reduce the intrusion of debris into the module housing. Compared to a grease-filled spline interface, periodic oiling (as much as each time the cutterbar stops) dramatically improves the life of the spline interface and reduces fretting of the spline teeth.

The number of apertures 61 may easily be increased. In an alternate embodiment, alternate apertures 61a are axially positioned adjacent to the outward face of pinion gear 43 such oil flowing down the surface of the gear may also be directed into aperture 61a. The alternate apertures 61a may replace apertures 61 or may be used in conjunction with aperture 61. While at least three apertures are preferred, more may be used to increase the volume of oil being directed into the splines. The apertures may be co-planar or may be displaced axially from one another along the length of the splines.

Further improvement in the spline interface service life is provided by a means to bias the drive shaft 72 such that it is radially centered on axis 100. The biasing means is provided in lieu of total reliance on the spline interface to radially center the shaft. As the splines wear and looseness or play develops in the spline interface connection, the center of rotation of drive shaft 72 may oscillate slightly during shaft rotation. The oscillation creates vibration in the drive train and accelerates wear on the spline interface. The present invention includes a radial centering structure 75 on each spline end of drive shaft 72 which extends further into hub structure, normally beyond the end of the spline receptacle 48 where it is received by a radial alignment recess 76. Tolerances between the centering structure 75 and the alignment recess 76 are sufficiently close that the drive shaft 72 and centering structure 75 may be inserted axially into the hub and alignment recess 76 while maintaining the drive shaft 72 centered on axis 100. The result of a positive centering mechanism more uniformly distributes loading on the spline teeth and thus improves durability of the spline interface. Reversing the relative positions of the alignment recess and the centering structure is also contemplated, but not preferred, within the scope of this invention as removal of sufficient material from the end of the drive shaft to create the alignment recess may result in unacceptable material stress levels.

Still further improvements in the spline interface durability are provided by a means to balance the engagement length of the splines 73 on each end of the drive shaft 72 in the spline receptacles 48. The drive train is configured such that a small amount of lateral displacement of the drive shafts 72 is allowable to avoid interference when assembling the cutter and spacers modules. During operation, the drive shaft 72 may tend to migrate to one extreme between the cutter modules resulting in differences between the engaged areas of the splines at each end. The disparity in spline engagement results in increased wear rates on the lesser-engaged spline and eventually drive train imbalance. The present invention provides a lateral biasing element disposed in the spline connections to urge the drive shaft 72 laterally to a position at which the engaged length of the splines 73 in the spline receptacles 48 is approximately equal at each end of the drive shaft. Lateral biasing element 80 is positioned between an flat 79 located adjacent to the end of the splines 48 on drive shaft 72 and a corresponding landing 81 within the spline receptacle. In a preferred embodiment, biasing element 80 is a spring, specifically a wave spring, configured to fit around the radial centering structure 75 to retain it in position as the drive shaft is inserted into the hub.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A drive train for distributing motive power in a modular disc cutterbar, the cutterbar having a plurality of transversely spaced-apart cutter modules, each module having a rotating head powered by the drive train and a generally hollow housing enclosing a geared connection between the rotating head and the drive train, the housing further containing a volume of lubricant for the geared connection and the drive train, the drive train comprising:
   a plurality of elongate drive transfer shafts aligned on a transverse rotational axis, one of said plurality of drive shafts disposed between each adjacent pair of the cutter modules, each shaft having an axially-displaceable, torque-transferring connector at each end;
   a pinion assembly having first and second hubs connected by a pinion shaft for rotation in unison on the rotational axis, one said pinion assembly disposed in and rotatably supported by each of the plurality of module housings, each said hub having a receptacle configured to axially receive one said connector at one end of one of said plurality of drive shafts;
   at least one lubricating element extending radially from each said hub and positioned within the housing for dispersing the lubricant about the interior of the housing when said pinion assembly is rotating; and
   a plurality of apertures in each said hub extending from an outer surface of said hub inwardly to said receptacle, said plurality of apertures positioned adjacent to said at least one lubricating element so that a portion of the lubricant flowing by gravity on the surface of said at least one lube element is directed to one of said plurality of apertures and inwardly to said receptacle when said pinion assembly is not rotating.

2. The drive train of claim 1, wherein said plurality of apertures are radially symmetrically disposed about the rotational axis.

3. The drive train of claim 2, wherein said plurality of apertures is at least three apertures and at least one of said apertures is generally upwardly oriented when said pinion assembly is not rotating, thereby enabling lubricant flowing on the surface of said at least one lubricating element to flow into one of said apertures by gravity.

4. The drive train of claim 1, wherein said at least one lubricating element is an oil slinger.

5. The drive train of claim 1, wherein said at least one lubricating element is a pinion gear.

6. The drive train of claim 1, wherein said torque transferring connector is a splined connector.

7. The drive train of claim 1, wherein each said hub and each end of each of said plurality of shafts further comprise a radial bias device configured to radially center each drive shaft on said rotational axis when the torque-transferring connector end of one drive shaft is inserted into one of said receptacles.

8. The drive train of claim 7, wherein said radial bias device comprises a guide structure extending axially along said rotational axis distally from each said connector and a guide recess disposed in each said receptacle and oriented on said rotational drive axis.

9. The drive train of claim 8, further comprising a plurality of lateral bias devices, one of said plurality of lateral bias devices disposed in each said receptacle and configured to act upon an end of each said drive shaft to equalize the engagement length of each end of each of said plurality of drive shafts in respective said receptacles of adjacent cutter modules.

10. The drive train of claim 9, wherein said lateral bias device is a spring.

11. The drive train of claim 10, wherein said spring is a wave spring.

* * * * *